W. M. ROHN.
EXPLOSION ENGINE PISTON AND PISTON RING.
APPLICATION FILED OCT. 9, 1916.

1,232,846.

Patented July 10, 1917.

Inventor
William M. Rohn
By David P. Moore.
Attorney

UNITED STATES PATENT OFFICE.

WILLIAM M. ROHN, OF DETROIT, MICHIGAN.

EXPLOSION-ENGINE PISTON AND PISTON-RING.

1,232,846.　　　　　Specification of Letters Patent.　　Patented July 10, 1917.

Application filed October 9, 1916. Serial No. 124,480.

*To all whom it may concern:*

Be it known that I, WILLIAM M. ROHN, a citizen of the United States, residing at Detroit, in the county of Wayne and State of Michigan, have invented certain new and useful Improvements in Explosion-Engine Pistons and Piston-Rings, of which the following is a specification, reference being had therein to the accompanying drawing.

This invention relates to improvements in explosion engine pistons, one object of the invention being the provision of means that will prevent the lubricating oil from passing beyond a predetermined portion of the piston, namely, the lower packing ring, so that no carbonizing of the interior of the cylinder and spark plug will be permitted.

A further object of the present invention is the provision of a piston in which there is formed upon one wall of the lower piston ring recess a groove which is in communication with the interior of the piston, so that the surplus of lubricating oil can be taken care of during the reciprocation of the piston.

A still further object of the present invention is to provide a corresponding recess in the piston ring, so that as the piston ring moves over the cylinder surface, the edge formed by the recess or groove of the ring will tend to scrape upon the downward movement of the piston any surplus lubricant from the walls and direct the same into the annular recess formed by the two grooves and finally into the hollow portion of the piston, said combination of grooves also affording the means to prevent the passage of the lubricant above certain portions of the cylinder and preventing the entrance thereof into the combustion chamber.

In the accompanying drawings:—

Figure 1:
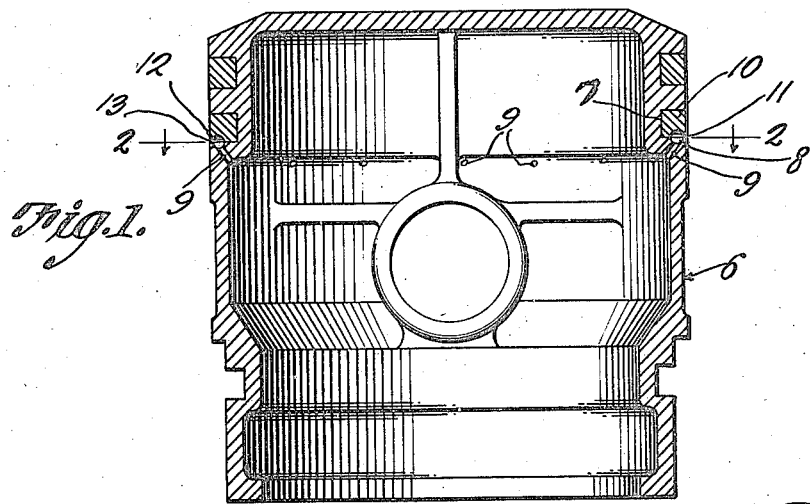
Figure 1 is a vertical section through a piston, made according to and embodying the present invention.
Figure 2:
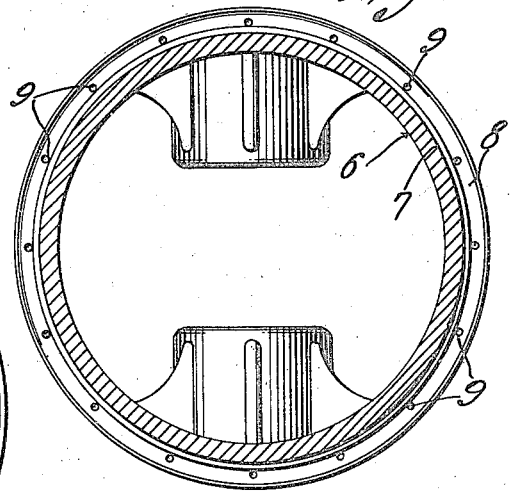
Fig. 2 is a cross section taken on line 2—2 of Fig. 1.
Figure 3:
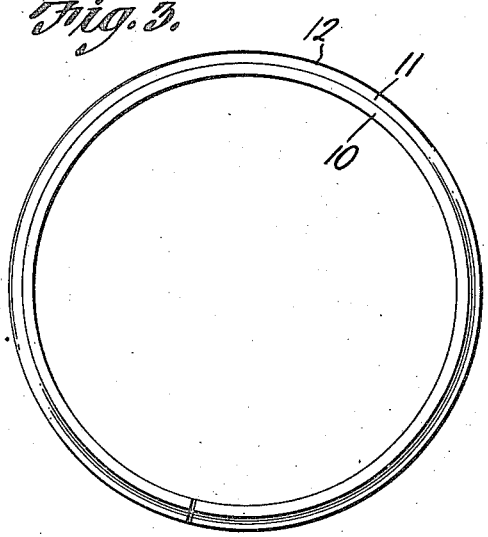
Fig. 3 is a bottom plan view of the lower piston ring *per se*.
Figure 5:
Fig. 5 is a cross section on an enlarged scale through such piston ring.
Figure 4:
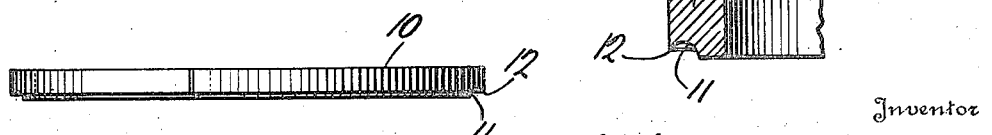
Fig. 4 is a view in elevation thereof.

Referring to the drawings, the numeral 6 designates the complete piston, being provided with the ring grooves or recesses 7, the lower one of which as here shown is provided with the circumferential groove 8 in the lower wall of the recess 7. Leading from this groove 8 into the cavity of the piston, are the inclined openings or bores 9, which permit an egress for the lubricant.

The lower piston ring 10 has formed upon one face thereof, and such face being the one to oppose the groove 8, a groove 11, providing the overhang rim 12.

Thus, when the piston ring 10 is assembled in the piston, as shown in Fig. 1, the two grooves 8 and 11 form a circumferential cavity the full circumference of the piston with an open mouth 13 between the outer lower edge of the ring and the lower wall of the recess 7.

With this arrangement, the lubricating oil is permitted to enter the space formed by the grooves 8 and 11, and finally the bores 9, so that the pressure of the piston upon the compression or exhaust stroke, forces the lubricating oil through the bores 9, and prevents such oil from passing to the exterior top of the piston to cause carbonizing thereof and the spark plugs as well.

It is also apparent that this arrangement will retain and permit sufficient oil to be supplied to lubricate the piston and cylinder and other working parts.

What I claim as new is:—

1. A piston having a ring recess, the wall of which is provided with a circular groove having openings leading therefrom into the cavity of the piston, and a piston ring filling said recess and having a circular groove to oppose the groove of the piston to form therewith a circumferential cavity.

2. A piston having a ring recess, the lower wall of which is provided with a groove having openings leading therefrom into the cavity of the piston, and a packing ring provided with a groove that coöperates with the first groove to provide a circumferential lubricant receiving and directing cavity.

3. A piston having a ring recess, the lower wall of which is provided with a groove having openings leading therefrom into the cavity of the piston, and a packing ring provided with a groove upon its lower face adjacent the outer face of the ring, said ring when in the ring recess presenting its groove so as to combine with the groove of the piston to form a circumferential cavity with an annular mouth through the face of the piston and packing ring.

4. The combination with a piston having a ring recess, the lower wall of which is provided with a circular groove having openings leading therefrom into the cavity of the piston, of a piston ring fitting in said recess and having a portion of the outer edge thereof adjacent to the circular groove recessed to coöperate with the groove of the piston to prevent the passage of the lubricant into the combustion chamber of the engine.

5. The combination with a piston having a ring recess, the lower wall of which is provided with a circular groove having openings leading therefrom into the cavity of the piston, of a piston ring having a circumferential groove formed adjacent the outer lower corner thereof and disposed to coöperate with the circular groove to provide an open annular space adjacent the periphery of the piston and ring.

In testimony whereof I affix my signature.

WILLIAM M. ROHN.